(12) United States Patent
Pal

(10) Patent No.: US 9,660,505 B2
(45) Date of Patent: May 23, 2017

(54) ELECTRICAL MACHINE WITH REDUCED WINDAGE LOSS

(75) Inventor: Debabrata Pal, Hoffman Estates, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1088 days.

(21) Appl. No.: 13/245,275

(22) Filed: Sep. 26, 2011

(65) Prior Publication Data
US 2013/0076169 A1 Mar. 28, 2013

(51) Int. Cl.
*H02K 9/19* (2006.01)
*H02K 1/32* (2006.01)
*H02K 16/00* (2006.01)

(52) U.S. Cl.
CPC ............ *H02K 9/19* (2013.01); *H02K 1/32* (2013.01); *H02K 16/00* (2013.01); *H02K 2205/12* (2013.01)

(58) Field of Classification Search
CPC ........ H02K 9/19; H02K 1/20; H02K 2205/12; H02K 1/32
USPC ............................. 310/52, 53, 54, 58, 59, 89
See application file for complete search history.

(56) References Cited

U.S. PATENT DOCUMENTS

| | | | | |
|---|---|---|---|---|
| 2,610,992 A * | 9/1952 | Johns | ..................... | H02K 9/18 310/113 |
| 3,407,317 A * | 10/1968 | Honsinger | ............... | H02K 9/06 310/58 |
| 3,518,467 A * | 6/1970 | Wightman | ............... | H02K 9/14 310/417 |
| 3,725,706 A * | 4/1973 | Lukens | ..................... | H02K 9/06 310/62 |
| 5,714,819 A * | 2/1998 | Gilliland | ................... | A47L 5/22 310/58 |
| 6,087,744 A * | 7/2000 | Glauning | ................. | H02K 1/32 310/58 |

(Continued)

FOREIGN PATENT DOCUMENTS

DE 102010001705 A1 * 8/2011
JP 2011142785 A * 7/2011

OTHER PUBLICATIONS

JP 2011142785 A and DE102010001705 A1 machine translation Sep. 30, 2016.*

(Continued)

*Primary Examiner* — Dang Le
*Assistant Examiner* — Leda Pham
(74) *Attorney, Agent, or Firm* — Cantor Colburn LLP

(57) ABSTRACT

An electrical machine includes a rotor located at a central shaft and a stator located radially outboard of the rotor and secured at a back iron. A first baffle is coupled to the central shaft at one axial end of the rotor, the baffle extending radially outwardly from the shaft toward a baffle cavity at the back iron. A flow of coolant is urged toward the baffle cavity along the baffle via centrifugal force. A method of flowing coolant through an electrical machine includes injecting a flow of coolant substantially radially into an electrical machine cavity. The flow of coolant is urged radially outwardly along a rotating baffle located at one axial end of a rotor of the electrical machine via centrifugal force and into a baffle cavity disposed at the back iron at a radial end of the baffle.

14 Claims, 5 Drawing Sheets

(56) References Cited

U.S. PATENT DOCUMENTS

| | | | |
|---|---|---|---|
| 6,727,609 B2 * | 4/2004 | Johnsen | H02K 1/32 310/52 |
| 7,157,818 B2 * | 1/2007 | Jones | 310/63 |
| 8,242,646 B2 * | 8/2012 | Tatematsu | B60L 3/0061 310/52 |
| 2004/0113500 A1 | 6/2004 | Casey et al. | |
| 2008/0303360 A1 * | 12/2008 | Vinson | H02K 5/1732 310/59 |
| 2009/0058205 A1 * | 3/2009 | Tounosu | H02K 1/32 310/61 |
| 2010/0176670 A1 * | 7/2010 | Gottfried | H02K 1/20 310/61 |

OTHER PUBLICATIONS

Extended European Search Report for EP Application No. 12185571.2-1809, dated Sep. 2, 2016, pp. 1-23.

* cited by examiner

ELECTRICAL MACHINE WITH REDUCED WINDAGE LOSS

BACKGROUND

The subject matter disclosed herein relates to electrical machines. More specifically, the subject matter disclosed herein relates to liquid coolant flow through electrical machines.

A typical liquid cooled electric machine, in this case, a generator 100, is shown in FIG. 5. The generator 100 shown is dual-channel, having two rotors 102 and two stators 104. Each rotor 102 is surrounded by a stator 104 and an air gap 106 exists between each rotor 102 and each stator 104. Liquid coolant 108 is flowed through a hollow shaft 110 and is sprayed outwardly from the shaft 110 across rotor windings 112 and stator windings 114 to cool them and other components of the generator 100. The coolant 108 then is returned, via gravity, to a sump 116 of the generator 100. From the sump 116, the coolant exits the generator 100 through one or more scavenge ports 118 for recirculation through the system. Such liquid cooled generators 100 typically have poor coolant management leading to insufficient or slow scavenging leading to buildup of coolant levels in the sump 116. If the coolant level reaches the air gap 106, the result is greatly increased windage and friction losses as the rotor 102 rotates through the accumulated coolant 108. Such increased losses can lead to rotor and/or stator failure.

SUMMARY

An electrical machine includes a rotor located at a central shaft and a stator located radially outboard of the rotor and secured at a back iron. A first baffle is coupled to the central shaft at one axial end of the rotor, the baffle extending radially outwardly from the shaft toward a baffle cavity at the back iron. A flow of coolant is urged toward the baffle cavity along the baffle via centrifugal force.

In another embodiment, an electrical machine includes two or more rotors arranged axially along a central shaft and two or more stators located at a back iron, each stator positioned radially outboard of a rotor of the two or more rotors. The machine includes a plurality of baffles, each baffle located at an axial end of a rotor of the two or more rotors. Each baffle of the plurality of baffles extends radially outwardly from the shaft toward a plurality of baffle cavities at the back iron. A flow of coolant is urged toward the plurality of baffle cavities along the plurality of baffles via centrifugal force.

A method of flowing coolant through an electrical machine includes injecting a flow of coolant substantially radially into an electrical machine cavity. The flow of coolant is urged radially outwardly along a rotating baffle located at one axial end of a rotor of the electrical machine via centrifugal force and into a baffle cavity disposed at the back iron at a radial end of the baffle.

These and other advantages and features will become more apparent from the following description taken in conjunction with the drawings.

DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
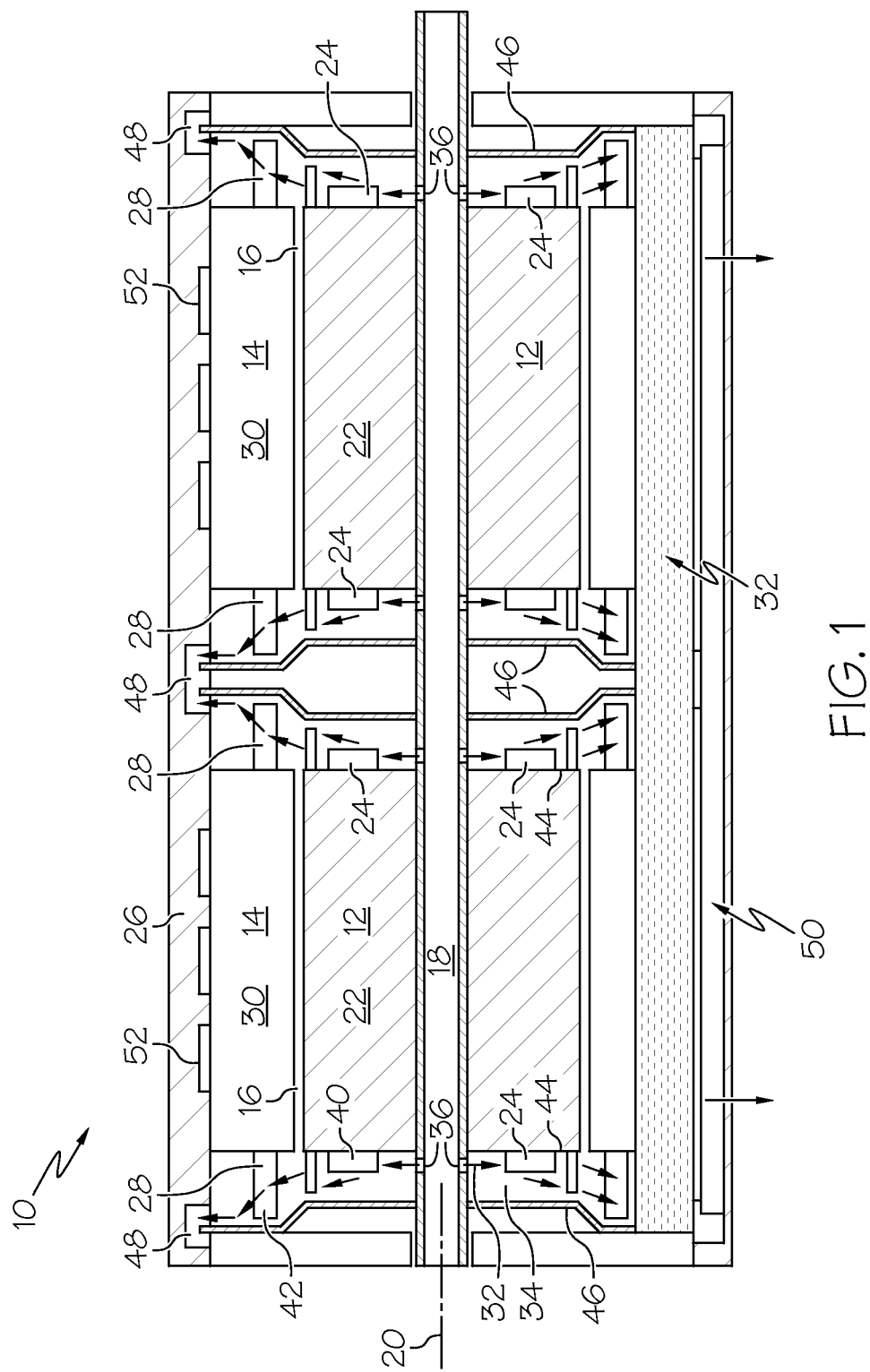
FIG. 1 is a cross-sectional view of an embodiment of an electrical machine.

Shown in FIG. 1 is an embodiment of an electrical machine 10, for example, a generator. The electrical machine 10 described herein is a dual channel electrical machine 10, having two rotors 12 and two stators 14, with each stator 14 surrounding at least a portion of one rotor 12 such that an air gap 16 exists between each rotor 12 and the respective stator 14. It is to be appreciated that while a dual channel electrical machine 10 is shown and described herein, electrical machines 10 with any number of channels, for example, 1, 3 or 4 channels would benefit from utilization of the present disclosure.

The rotors 12 are located at a central shaft 18 that rotates about a shaft axis 20 and are secured thereto such that the rotors 12 rotate about the shaft axis 20 with the shaft 18. Each rotor 12 includes a rotor core 22 with one or more rotor windings 24 having a plurality of rotor conductors located at the rotor core 22. The stators 14 are located radially outboard of the respective rotors 12, and are secured to a stator back iron 26, or housing. The stators 14 include one or more stator windings 28 having a plurality of stator conductors located at a stator core 30.

As the shaft 18 rotates, a flow of coolant, for example oil 32, is urged through the shaft 18 and into a machine cavity 34 through a plurality of coolant spray openings 36 in the shaft 18. Rotation of the shaft 18 forces the oil 32 radially outwardly toward the rotor winding 24 end turns 40 and stator winding 28 end turns 42. As the oil 32 flows past or impacts rotor end turns 40 and stator end turns 42 (and other components) of the electrical machine 10, thermal energy is transferred to the oil 32 from the rotor end turns 40 and stator end turns 42 (and other components) thus cooling them.

At each rotor end 44 of each rotor 12, a baffle 46 is affixed to the shaft 18 and rotates with the shaft 18. The baffle 46 extends radially outwardly from the shaft 18 toward the back iron 26, and into a baffle cavity 48 in the back iron 26. The baffle 46 contains and directs the oil 32 toward the baffle cavity 48, via centrifugal force due to the rotation of the baffle 46. When the oil 32 flows to the baffle cavity 48, the oil 32 flows to a scavenge core 50 in the back iron 26 via gravity. The oil 32 may then reject the thermal energy gained via, for example, a heat exchanger (not shown) and may be recirculated through the electrical machine 10. The baffles 46 located between adjacent rotors 12 additionally prevent cross-flow of coolant from adjacent rotors 12, thus preventing an increased temperature at those near ends 44 of the rotors 12.

Figure 2:
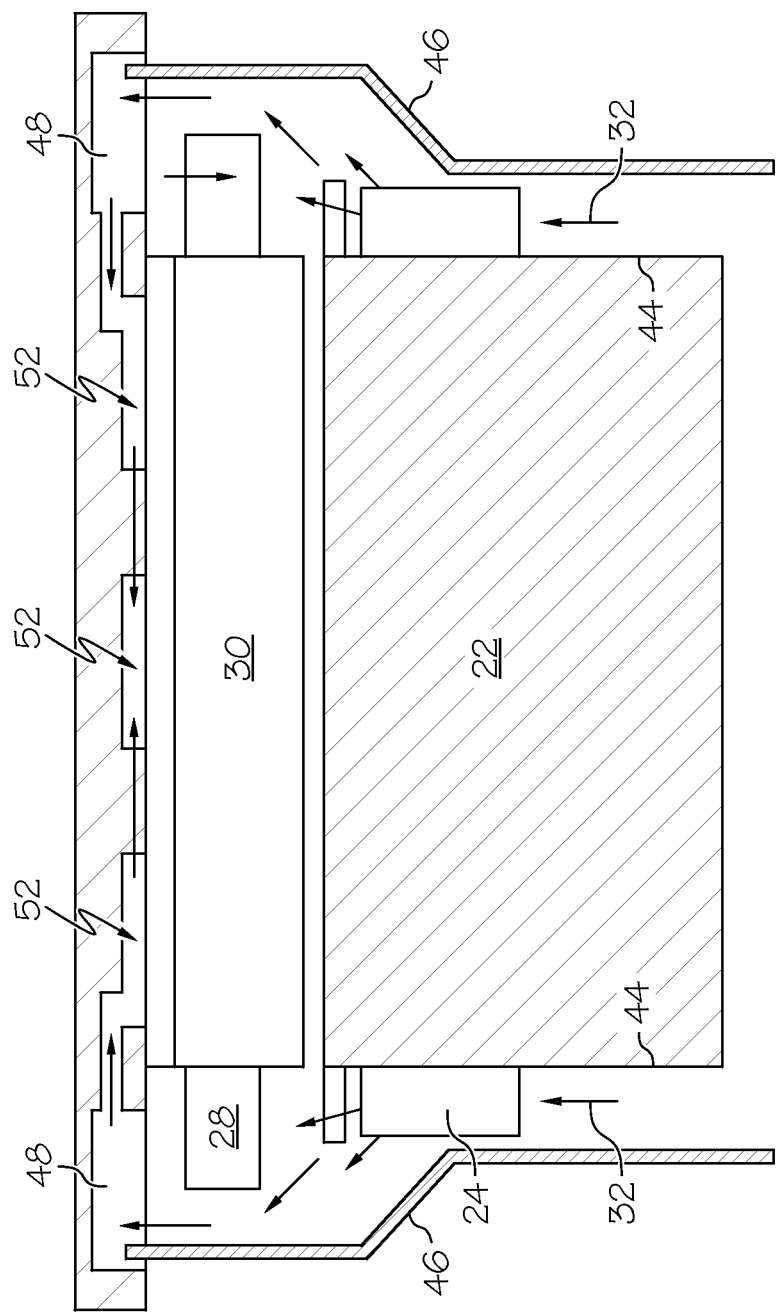
FIG. 2 is a cross-sectional view of another embodiment of an electrical machine.

Referring now to FIG. 2, some electrical machines 10 may include one or more back iron cooling channels 52 in the back iron 26 radially outboard of the stator core 30. The back iron cooling channels 52 extend axially along and circumferentially around the back iron 26. The back iron cooling channels 52 facilitate a flow of coolant therethrough to additional cool the stator 14 at the stator core 30. In some embodiments, the back iron cooling channels 52 are connected to the baffle cavity 48 such that high pressure oil 32 in the baffle cavity 48, due to the centrifugal force, is urged into the back iron cooling channels 52. As shown, the oil 32 flows into, and circumferentially around the outer back iron cooling channels 52 axially closest to rotor ends 44, then proceeds to inner back iron cooling channels 52.

Figure 3:
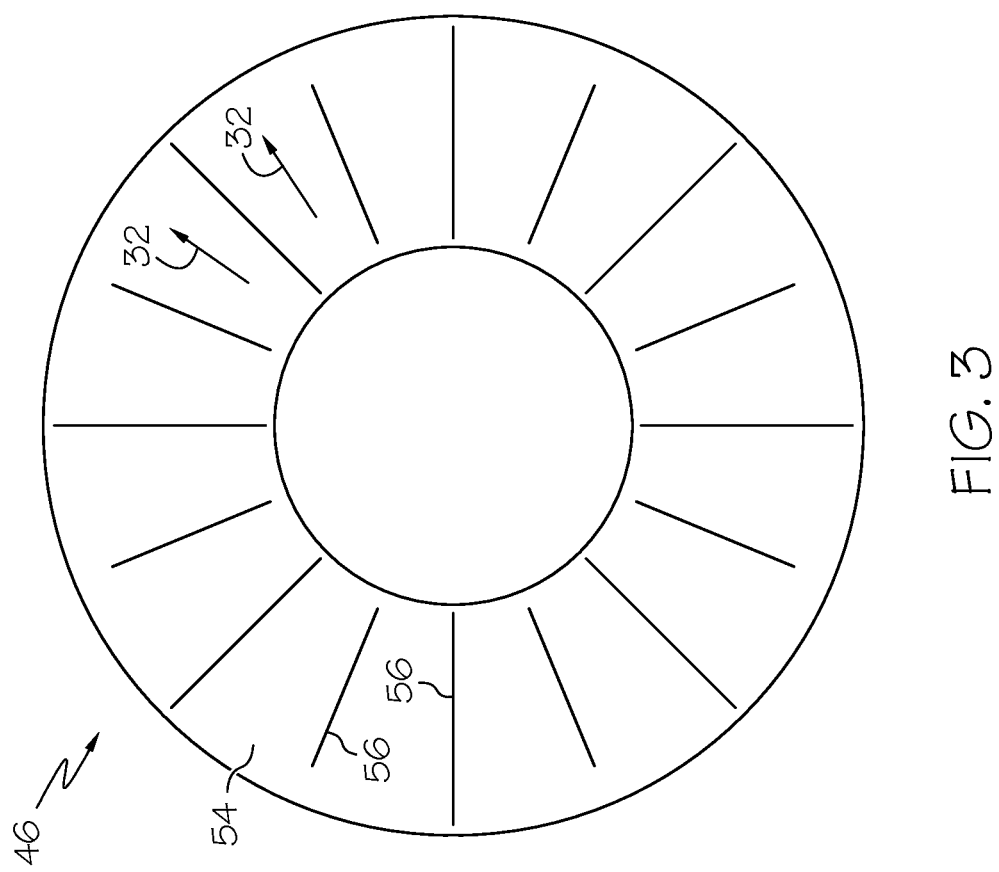
FIG. 3 is a plan view of an embodiment of a baffle for an electrical machine.
Figure 4:
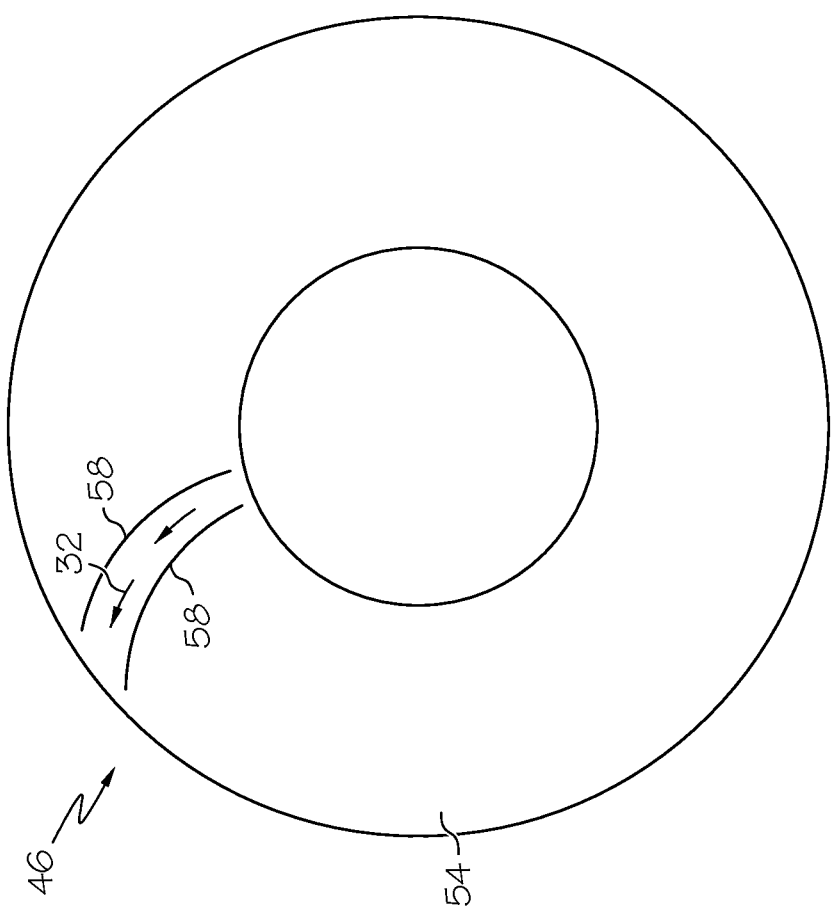
FIG. 4 is a plan view of another embodiment of a baffle for an electrical machine.
Figure 5:
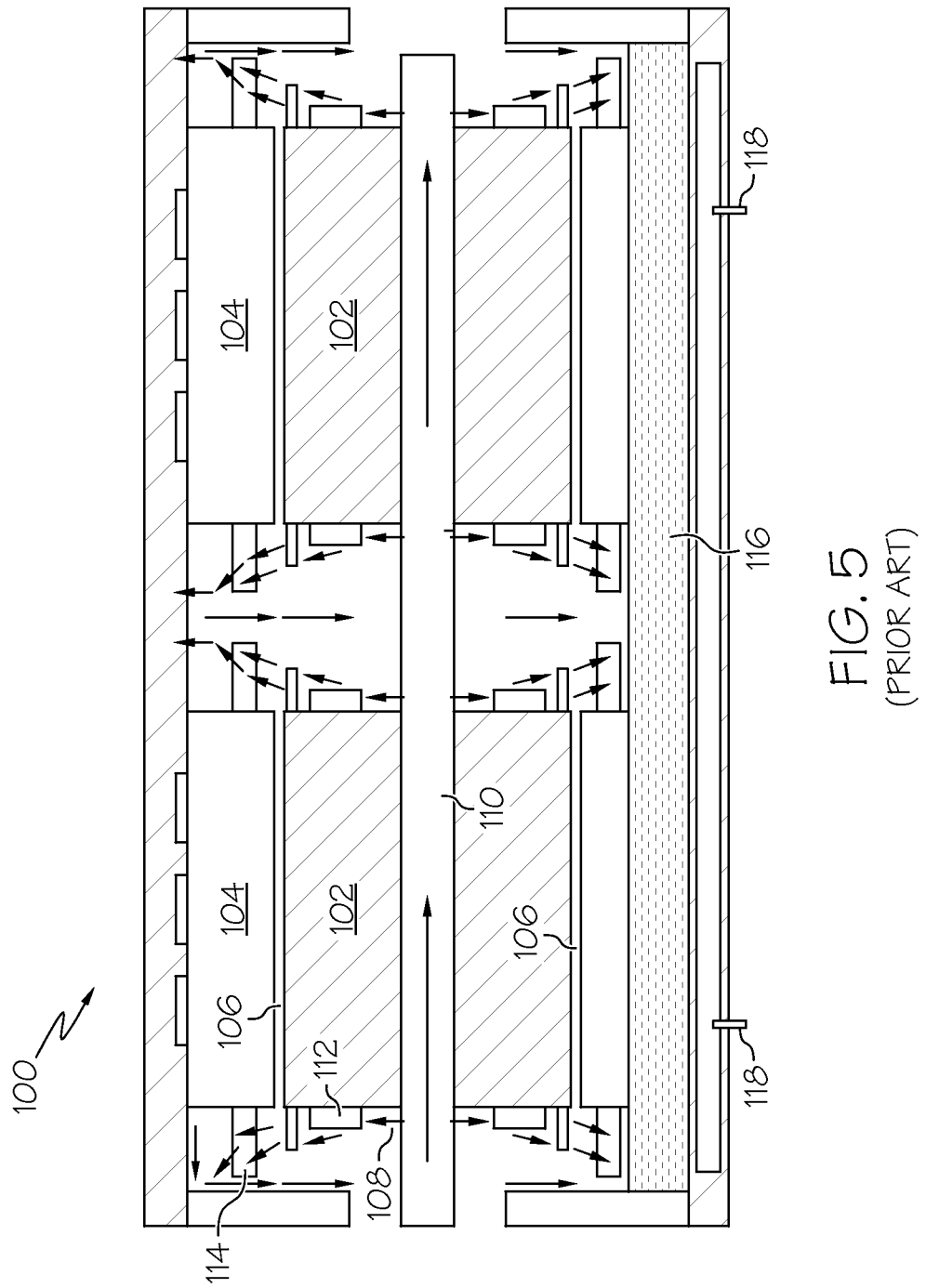
FIG. 5 is a cross-sectional view of a typical electrical machine.

Referring to FIGS. 3 and 4, the baffle 46 may include enhancements on a baffle face 54 to additionally direct the oil 32 as desired. For example, referring to FIG. 3, the baffle face 54 may include a plurality of radial grooves 56, or referring to FIG. 4, the baffle face may include a plurality of curved grooves 58. The grooves 56, 58 or other similar enhancements such as ridges or the like, enhance flow of the oil 32 in the radial direction toward the baffle cavity 48.

The baffle 46 directing the oil 32 to the baffle cavity 48 for scavenging substantially improves scavenge performance, thus reducing a level of oil 32 in a sump thereby reducing windage and friction losses during operation of the electrical machine 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrical machine comprising:
    a rotor disposed at a central shaft, wherein the central shaft is hollow;
    a stator disposed radially outboard of the rotor and secured at a back iron; and
    a first baffle disposed coupled to the central shaft at one axial end of the rotor, the baffle extending radially outwardly from the central shaft toward a baffle cavity at the back iron such that a portion of the baffle closest to the baffle cavity is farthest from the one axial end of the rotor and a portion of the baffle closest to the central shaft is closest to the one axial end of the rotor;
    wherein a flow of a liquid coolant is urged radially, originating from the central shaft, toward the baffle cavity along the baffle via centrifugal force and the baffle directs the flow of the liquid coolant radially from the central shaft between the baffle and a rotor winding and a stator winding toward the baffle cavity.

2. The electrical machine of claim 1, wherein the baffle includes a plurality of enhancements at a baffle face to radially direct the liquid coolant along the baffle.

3. The electrical machine of claim 2, wherein the baffle enhancements are a plurality of grooves.

4. The electrical machine of claim 1, further comprising: a second baffle coupled to the central shaft at another axial end of the rotor.

5. The electrical machine of claim 1, further comprising a plurality of back iron cooling channels disposed at the back iron radially outboard of the stator.

6. The electrical machine of claim 5, wherein the plurality of back iron cooling channels are connected to the baffle cavity to allow for the flow of the liquid coolant from the baffle cavity through the plurality of back iron cooling channels.

7. An electrical machine comprising:
    two or more rotors arranged axially along a central shaft, wherein the central shaft is hollow;
    two or more stators disposed at a back iron, each stator disposed radially outboard of a rotor of the two or more rotors; and
    a plurality of baffles, each baffle disposed at an axial end of a rotor of the two or more rotors, each baffle of the plurality of baffles extending radially outwardly from the central shaft toward a plurality of baffle cavities at the back iron such that a portion of each baffle that is closest to the respective baffle cavity is farthest from the respective axial end of the rotor and a portion of each baffle that is closest to the central shaft is closest to the respective axial end of the rotor;
    wherein a flow of liquid coolant is urged radially from the central shaft toward the plurality of baffle cavities along the plurality of baffles via centrifugal force and the plurality of baffles direct the flow of the liquid coolant radially from the central shaft between each of the plurality of baffles and a rotor winding and a stator winding toward the plurality of baffle cavities.

8. The electrical machine of claim 7, wherein at least one baffle of the plurality of baffles includes a plurality of enhancements at a baffle face to radially direct the liquid coolant along the baffle.

9. The electrical machine of claim 8, wherein the baffle enhancements are a plurality of grooves.

10. The electrical machine of claim 7, further comprising a plurality of back iron cooling channels disposed at the back iron radially outboard of the stator.

11. The electrical machine of claim 10, wherein the plurality of back iron cooling channels are connected to the plurality of baffle cavities to allow for the flow of the liquid coolant from the plurality of baffle cavities through the plurality of back iron cooling channels.

12. A method of flowing coolant through an electrical machine comprising:
    injecting a flow of liquid coolant substantially radially into an electrical machine cavity from a central shaft, wherein the central shaft is hollow;
    urging the flow of the liquid coolant radially outwardly along a rotating baffle disposed at one axial end of a rotor of the electrical machine via centrifugal force;
    urging the flow of the liquid coolant into a baffle cavity disposed at the back iron at a radial end of the baffle based on the baffle being closest to the one axial end at a portion of the baffle that is closest to the central shaft and the baffle being farthest from the one axial end at a portion of the baffle that is farthest from the central shaft; and
    urging the flow of the liquid coolant radially from the central shaft between the baffle and a rotor winding end turn and a stator winding end turn of the electrical machine into the baffle cavity.

13. The method of claim 12, further comprising urging the flow of the liquid coolant from the baffle cavity through a back iron cooling channel disposed radially outboard of a stator of the electrical machine.

14. The method of claim 12, wherein injecting the flow of the liquid coolant into the electrical machine cavity comprises injecting the flow of the liquid coolant through a plurality of coolant spray holes at a shaft of the electrical machine.

* * * * *